Patented Mar. 29, 1932

1,851,914

UNITED STATES PATENT OFFICE

HEINRICH LIER, OF BASEL, SWITZERLAND, ASSIGNOR TO THE FIRM CHEMICAL WORKS FORMERLY SANDOZ, OF BASEL, SWITZERLAND

MANUFACTURE AND USE OF NEW WETTING PREPARATIONS

No Drawing. Application filed June 3, 1930, Serial No. 459,122, and in Germany June 17, 1929.

I have found that very valuable wetting preparations which possess a great efficacy when used in mercerizing lyes can be prepared by mixing phenols, like phenol, cresols, xylenols and others, with such derivatives of polyhydric aliphatic alcohols that contain at least one free hydroxyl group and at least one —R—O—$R_1$—group, wherein R and $R_1$ represent alkyl, aralkyl, aryl, alkylidene, aralkylidene, alkylene, aralkylene and arylene groups. Such compounds are for instance the mono-(alkyl-, aralkyl-, aryl-) ethers of glycol and of polyethylene glycols, the polyethyleneglycols themselves, mono- and di-alkylethers and the acetals of glycerine.

When added to alkaline lyes, these mixtures impart to them very durable wetting-out properties, which are not affected by the temperatures generally used in mercerizing processes. In order to obtain the desired effect, the above described mixtures are added in suitable quantities to the alkaline lyes of various concentrations or the mixtures are generated therein by adding their constituents under good stirring.

According to the present invention it is possible to mercerize dry raw sized cotton fibres very rapidly and to obtain a very high lustre in a single treatment.

The following examples, without being limitative, illustrate the new process, the parts being by weight.

Example 1

To 100 parts of a caustic soda solution of 38° Bé. are added under good stirring 0,94 parts of phenol and thereafter 0,17 parts of diethyleneglycolmonoethylether, stirring being continued until the solution becomes completely homogeneous. The thus obtained alkali lye is ready to be used for mercerizing whereby it wets out immediately raw sized cotton fabrics and allows to obtain a level mercerization in a very short time.

Example 2

To a mercerizing lye of 35° Bé. are added 1,14 per cent. of a mixture consisting of 98 per cent. of a technical cresol mixture and 2 per cent. of technical diethylene glycol-monobutylether. The wetting-out action of the clear solution thus obtained is so great that raw popeline, which is very difficultly wetted out with aqueous solutions, is impregnated in a few moments so that it sinks down in the bath and shrinks rapidly.

Example 3

To 100 parts of a caustic soda solution of 30° Bé. are added 1,5 parts of a mixture consisting of 85 per cent. of a technical xylenol mixture and of 15 per cent. of a mixture of the monoxylenylglycerine isomers. The thus obtained clear solution immediately wets out raw sized cotton material.

Example 4

To 100 parts of a caustic soda solution of 32° Bé. are added 1,17 parts of a mixture composed of 90 per cent of a technical xylenol mixture, 8 per cent of glycerine monophenyl ether and of 2 per cent of ethyleneglycol monobutylether. The obtained clear solution possesses very strong wetting-out power and wets out in some seconds dry raw sized cotton tissues.

Example 5

To 100 parts of a caustic soda solution of 32° Bé. and at a temperature of 35° C. are added 1,17 parts of a mixture composed of 80 per cent of technical xylenols and of 20 per cent of acetoneglycerine of the formula

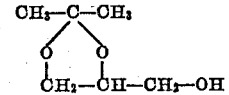

The thus obtained alkali lye possesses very good wetting-out properties for raw sized cotton yarns and fabrics.

What I claim is:—

1. A process for the preparation of wetting agents for use in mercerizing lyes, consisting in mixing phenols with such derivatives of polyhydric aliphatic alcohols that contain at least one free hydroxyl group and a least one —R—O—$R_1$—group, wherein R and $R_1$ represent alkyl, aralkyl, aryl, alkylidene, aralkylidene, alkylene, aralkylene and arylene groups.

2. A process for the preparation of wetting agents for use in mercerizing lyes, consisting in mixing phenols with such derivatives of dihydric aliphatic alcohols that contain at least one free hydroxyl group and at least one —R—O—$R_1$—group, wherein R and $R_1$ represent alkyl, aralkyl, aryl, alkylidene, aralkylidene, alkylene, aralkylene and arylene groups.

3. A process for the preparation of wetting agents for use in mercerizing lyes, consisting in mixing phenols with such derivatives of ethylene glycol that contain at least one free hydroxyl group and at least one —R—O—$R_1$—group, wherein R and $R_1$ represent alkyl, aralkyl, aryl, alkylidene, aralkylidene, alkylene, aralkylene and arylene groups.

4. A wetting agent for use in mercerizing lyes comprising phenols and such derivatives of polyhydric aliphatic alcohols that contain at least one free hydroxyl group and at least one —R—O—$R_1$—group, wherein R and $R_1$ represent alkyl, aralkyl, aryl, alkylidene, aralkylidene, alkylene, aralkylene and arylene groups.

5. A wetting agent for use in mercerizing lyes comprising phenols and such derivatives of dihydric aliphatic alcohols that contain at least one free hydroxyl group and at least one —R—O—$R_1$—group, wherein R and $R_1$ represent alkyl, aralkyl, aryl, alkylidene, aralkylidene, alkylene, aralkylene and arylene groups.

6. A wetting agent for use in mercerizing lyes comprising phenols and such derivatives of ethylene glycol that contain at least one free hydroxyl group and at least one —R—O—$R_1$—group, wherein R and $R_1$ represent alkyl, aralkyl, aryl, alkylidene, aralkylidene, alkylene, aralkylene and arylene groups.

7. A process for treating cellulosic fibres with alkali, consisting in submitting them to the action of mercerizing lyes containing phenols and such derivatives of aliphatic polyhydric alcohols which contain at least one free hydroxyl group and at least one group —R—O—$R_1$— wherein R and $R_1$ represent alkyl, aralkyl, aryl, alkylidene, aralkylidene, alkylene, aralkylene and arylene groups.

8. The mercerizing lyes of high wetting-out action, containing phenols and such derivatives of polyhydric aliphatic alcohols which contain at least one free hydroxyl group and at least one —R—O—$R_1$—group wherein R and $R_1$ represent alkyl, arakyl, aryl, alkylidene, aralkylidene, alkylene, aralkylene and arylene groups.

In witness whereof I have hereunto signed my name this 23rd day of May, 1930.

HEINRICH LIER.